United States Patent
Kenyon (10) Patent No.: US 10,198,768 B2
(45) Date of Patent: Feb. 5, 2019

(54) ORDER MESSAGE FLOW ROUTING ENGINE AND METHOD

(71) Applicant: Nasdaq, Inc., New York, NY (US)

(72) Inventor: Paul Kenyon, New York, NY (US)

(73) Assignee: NASDAQ, INC., New York, NY (US)

( * ) Notice: Subject to any disclaimer, the term of this patent is extended or adjusted under 35 U.S.C. 154(b) by 326 days.

(21) Appl. No.: 14/158,584

(22) Filed: Jan. 17, 2014

(65) Prior Publication Data

US 2015/0206235 A1 Jul. 23, 2015

(51) Int. Cl.
*G06Q 40/04* (2012.01)

(52) U.S. Cl.
CPC .................. *G06Q 40/04* (2013.01)

(58) Field of Classification Search
CPC ...................................... G06Q 40/04
USPC .......................................... 705/37
See application file for complete search history.

(56) References Cited

U.S. PATENT DOCUMENTS

| | | | | |
|---|---|---|---|---|
| 2003/0177086 | A1* | 9/2003 | Gomber | G06Q 40/04 705/37 |
| 2004/0267655 | A1* | 12/2004 | Davidowitz | G06Q 40/00 705/37 |
| 2006/0248006 | A1 | 11/2006 | Edvardson | |
| 2006/0253378 | A1* | 11/2006 | Adcock | G06Q 30/0633 705/37 |
| 2007/0005488 | A1 | 1/2007 | Keith | |
| 2007/0118457 | A1* | 5/2007 | Peterffy | G06Q 40/04 705/37 |
| 2008/0243676 | A1* | 10/2008 | Smith | G06Q 40/025 705/37 |
| 2009/0204534 | A1 | 8/2009 | Tilly et al. | |
| 2010/0293109 | A1 | 11/2010 | Jain et al. | |

FOREIGN PATENT DOCUMENTS

WO WO 2008/013776 1/2008

OTHER PUBLICATIONS

NASDAQ FAQ's, Oct. 17, 2012, Available at: https://web.archive.org/web/20121017141645/http://nasdaqtrader.com/content/marketregulation/regnms/regnms_faqs.pdf.*
International Search Report issued in Application No. PCT/SE2015/050023 dated Apr. 28, 2015.
Written Opinion issued in Application No. PCT/SE2015/050023 dated Apr. 28, 2015.

* cited by examiner

*Primary Examiner* — Shahid Merchant
*Assistant Examiner* — Michael J Warden
(74) *Attorney, Agent, or Firm* — Nixon & Vanderhye P.C.

(57) ABSTRACT

A routing device for routing an electronic order data message is provided. A storage medium stores a routing table and a transceiver communicates with a first set of computing nodes, a first electronic trading platform, and a second set of electronic trading platforms. An electronic order data message and an updated financial data message feed are accepted at the routing device. The marketable or non-marketable operation state of the electronic order data message is determined from the updated financial data message feed. The electronic order data message is then routed based on a selected routing strategy and a selected destination address. A non-marketable operation state routes the electronic order data message to the first electronic trading platform. A marketable operation state routes the electronic order data message to at least one of the second set of electronic trading platforms.

20 Claims, 8 Drawing Sheets

ORDER MESSAGE FLOW ROUTING ENGINE AND METHOD

TECHNICAL OVERVIEW

The technology herein relates to order data message routing and/or flow. More particularly, the technology herein relates to order data message routing and/or flow for an order router in an electronic exchange system.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Financial systems provide important contributions in today's society by allowing entities (e.g., companies, organizations, individuals) to invest, obtain capital, offset risk (or take on new risk), etc. One example of how financial systems are important in today's society is an electronic exchange platform (e.g., the NASDAQ® Stock Exchange) that is used to buy and sell stock—e.g., buy 100 shares of company A. The high level concept of simply purchasing 100 shares is understandable. However, the execution of such a process through an electronic exchange platform is a more technical process.

Electronic exchange platforms operate on data messages (e.g., an order, quote, etc) received from an external source (e.g., a client computer system). An order, which is included in a data message, may relate to buying or selling any type of financial instrument. Exchange platforms and systems associated with exchange platforms provide processes that can route incoming data messages (e.g., a request to buy/sell a given financial instrument) to one or more trading destinations.

One type of trading destination is a primary listing market for an electronic exchange platform that maintains an electronic order book (e.g., in computer memory) that stores submitted order messages or quote messages that can be used to fulfill, match, execute, etc an incoming order or the like. This type of electronic exchange platform can also maintain (or determine) a NBBO (National Best Bid and Offer) value, which is a term used in SEC (Securities and Exchange Commission) requirements that brokers must guarantee customers the best available ask price when they buy securities and the best available bid price when they sell securities. Thus, the NBBO includes the highest bid price for the financial instrument in any order book (e.g., the most someone is willing to buy the financial instrument), and the lowest offer price (e.g., the lowest someone is willing to sell the financial instrument) in any order book. Further, electronic exchange platforms may maintain (or determine) a BBO, which is the best bid and offer in the order book for a given electronic exchange platform. A properly maintained and deep order book (e.g., that has many entries, order messages that are still unexecuted and thus not yet matched or fulfilled, or entities willing to trade in a given financial instrument) helps to provide liquidity (e.g., the ease in which the financial instrument can be converted into cash) for the financial instrument.

There are different ways that client systems (e.g., by which an investor) can interact with an order book. One way is to submit what is known as a market order via an order message. This type of order message includes is an instruction to buy or sell the indicated financial instrument at the current NBBO (whatever that may be). While such an order is generally quick to execute (e.g., because there is likely to be an available counter party listed on the order book), the order will end up taking liquidity from the market because one or more orders on the order book (or a part of an order) will end up being fulfilled and removed from the order book.

Conversely, entities can also submit a non-marketable order. One way to submit a non-marketable order is by using a so called limit order (e.g., an order which includes instruction to buy at a specified price) that is outside the NBBO. This non-marketable order will then add liquidity to the market by adding to the order book instead of taking liquidity from it.

To help facilitate liquidity (e.g., encourage market participates to provide liquidity) in the market, electronic exchange platforms can charge a fee for those entities that take liquidity from the market and offer a rebate to those entities that provide liquidity to the market. For example, an electronic exchange platform may rebate 20 mil (millicents) per share for liquidity providers and charge 30 mil for liquidity takers.

Entities that interact with a trading destination (or multiple trading destinations) may adjust how order messages are handled and to which trading destination the order messages are submitted based on the above rebate and fee structure so as to obtain superior economics.

For example, an entity (e.g., a retail broker) may segregate orders between those that it perceives to be non-marketable orders (comprised of orders outside of the NBBO) and those it perceives to be marketable orders (at or within the NBBO). Based on this determination, orders that fall into one type or the other may be routed to different trading destinations. For example, non-marketable orders may be posted on so-called "maker-taker" exchange books (e.g., electronic exchange platforms that provide rebates for liquidity and fees for removing liquidity) that result in a rebate for the client while marketable order flow (orders that are at or within the NBBO) can be sent to destinations that may be willing to offer rebates for this type of liquidity.

One issue is that market volatility (e.g., a measure of the price variation of a financial instrument over time) may result in situations where orders that were initially perceived to be non-marketable become marketable prior to posting at an intended trading destination (e.g., an electronic exchange platform). This occurs because of the length of time it takes to route an order (e.g., a couple seconds) versus the amount of time it takes a financial instrument to move in price (e.g., less than a second). In other words, even though the trading entity may have a real-time data feed from various markets (including the trading destination to which the order is submitted), there are circumstances in which the price that is perceived by the entity upon submission of an order may be different from the price at receipt of the order.

In other words, an order submitted to a trading destination may be accepted and handled on a central order book of an electronic exchange platform and result in taking liquidity from the order book and incurring a fee, rather than generating the initially desired rebate. Hence there is a need to provide new, improved, or different order routing systems and methods to better match the needs of certain order submitting clients.

SUMMARY

Certain example embodiments provide an order routing system that detects whether an order is non-marketable to marketable and handles or routes the order based on that determination. An example order routing system routes an order that is determined to be marketable (e.g., one that changed "state" during the submission process) to another trading destination willing to pay for the order (and other associated orders—e.g., order flow). For example, a matching engine of an example exchange system may recognize non-marketable order flow received from a client system (e.g., a retail broker) that has become marketable. Such order flow may be re-directed to a wholesale community (e.g., one or more trading destinations) willing to pay for that order flow.

In certain example embodiments, order submitting clients (e.g., retail brokers) may receive higher payment for their order flow, price improvements, and/or avoid unintended "take" fees (removal of liquidity).

In certain example embodiments, wholesale order flow destinations may receive direct access to marketable order flow that would otherwise take from the order book of an exchange. Because of the marketability of the order flow involved (e.g., the order is at or within the NBBO), these destinations may be willing to pay (provide an increased rebated structure) for such order flow. In other words, client brokers may send perceived marketable order flow to, for example, wholesale destinations that are willing to pay for such order flow. Conversely, non-marketable order flow may be posted to an exchange. Non-marketable order flow that is marketable when received by the exchange may also be re-routed by the exchange to certain wholesale destinations.

In certain example embodiments, the organization that runs the order router and/or exchange order book may receive increased order flow (large volumes) from retail brokers that would otherwise post or be routed to other trading destinations (e.g., other exchanges).

In certain example embodiments, the order flow from retail brokers may advantageously balance the client type make-up that is posted on the order book of the exchange. This may make the exchange a more appealing destination to trade for other trading participants.

In certain example embodiments, an exchange may use the techniques described herein to encourage clients to provide their order flow to the exchange by creating a more opportunistic and economical venue for retail participants. In certain instances, posted retail order flow can create a multiplier effect, as other trading participants may prefer to trade on venues (e.g., the exchange) that include order flow that has a balanced make-up.

In certain example embodiments, a routing device for routing an electronic order data message is provided. The routing device includes a non-volatile storage medium, a transceiver, and a processing system. The storage medium stores a routing table and the transceiver communicates with a first set of computing nodes, a first electronic trading platform, and a second set of electronic trading platforms. The processing system is configured to accept an electronic order data message from one or more of the set of computing nodes. The processing system also accepts an updated financial data feed (e.g., that may be continuously updated) from the first electronic trading platform. The financial data message feed includes copies of different types of data messages kept in an order memory of the first electronic trading platform (e.g., visible and hidden data messages—such as those not visible by external customers). A marketable or non-marketable operation state of the accepted electronic order data message is determined by retrieving and comparing data from a predefined data field of the accepted electronic order data message to the updated financial data message feed. A routing strategy is selected and a destination address is determined from the selected routing strategy and determination of the marketable or non-marketable state of the electronic order data message. The electronic order data message is routed and/or transmitted (via the transceiver) to the destination address.

In certain example embodiments, when an order is determined to be marketable it is routed to a community of trading destinations (e.g., other exchanges, wholesale providers, dark pools, etc) that can provide various rebate structures. When an order is determined to be non-marketable is posted to an order book of an exchange from which a data feed is provided.

In certain example embodiments, a routing strategy for an accepted order is determined based on the logical or physical port through which the electronic order data message is accepted at the routing device.

In certain example embodiments, a confirmation message (e.g., as a result of matching an order) is sent to the client or origin node.

In certain example embodiments (e.g., when an order is determined to be marketable), the order is routed to other electronic trading platforms according to a stored order of those platforms.

In certain example embodiments, if an order is not fulfilled after being routed to the other electronic trading platforms it is submitted to the first electronic trading platform for execution (e.g., it is submitted as a post only limit order against the order book of the first electronic trading platform).

In certain example embodiments, determination of the marketability state of an accepted electronic order message is accomplished without submitting the order to the first electronic trading platform.

In certain example embodiments, the electronic order data message includes an identifier for a financial instrument (e.g., a ticker symbol) that is traded on the first electronic trading platform. The electronic order data message includes an indicated price for the identified financial instrument. In certain example embodiments, the electronic order data message includes an indication that the order for the financial instrument is a limit order.

A method may be implemented using a computer system according to certain example embodiments. In certain examples, a non-transitory computer-readable storage medium may store configuration information (instructions or computer code) for a computing system. These instructions may configure the computing systems in certain ways.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on non-transitory computer-readable storage medium and when the instructions are executed by a computer or other suitable processor control, the computer or processor performs the functions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

As used herein, financial instruments encompasses any tradable item—e.g., securities, derivatives, commodities, stocks, bonds, cash, swaps, futures, foreign exchange, options, gas electricity, and other items. Financial instruments can include groups of items traded through matching of counterparty orders (e.g., bid, offer).

Figure 1:
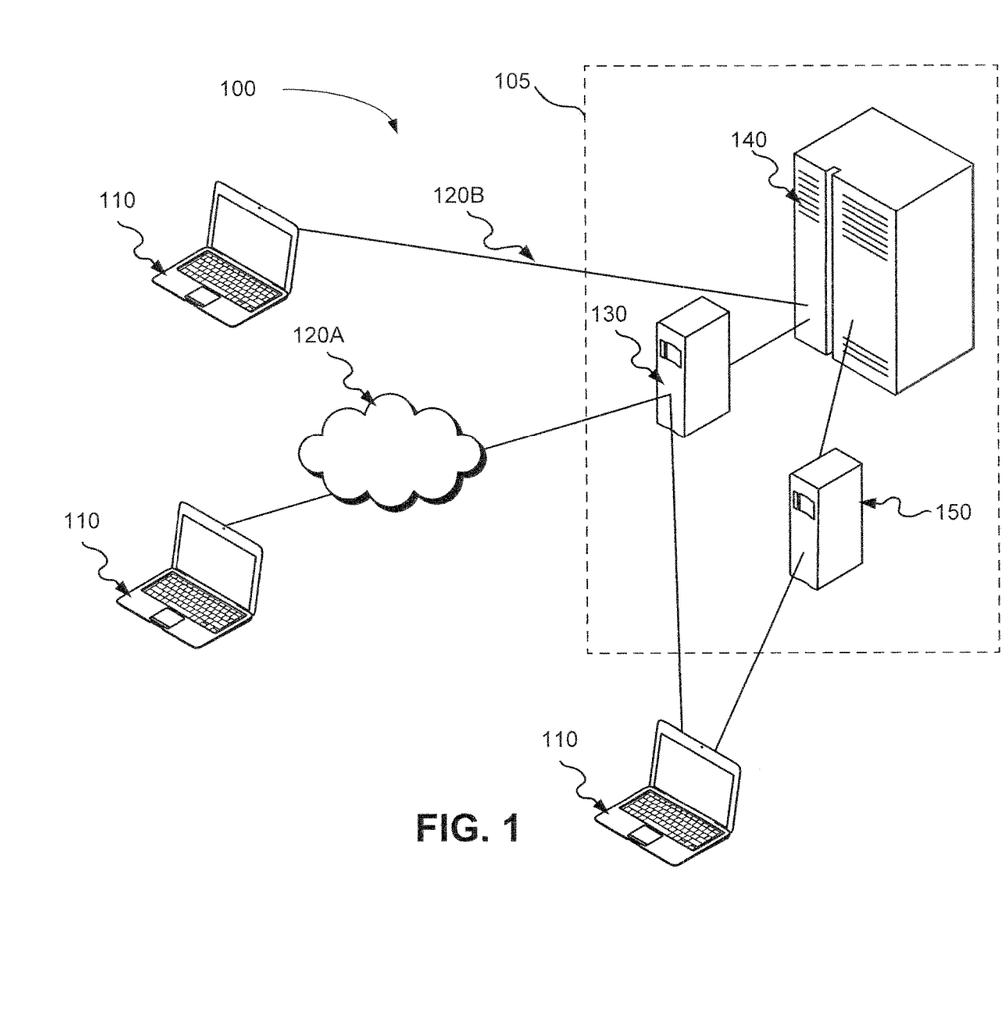
FIG. 1 illustrates a non-limiting example function block diagram of a computer-implemented exchange system coupled via a network to a client system configured to create and place orders with the exchange.

By way of introduction, FIG. 1 shows a block diagram of an example embodiment of a computer-implemented trading system that includes client systems configured to create and place orders with an electronic exchange platform. A trading system 100 includes client systems 110 that can be implemented using a personal computer, PDA device, cell phone, server computer, or any other system/device configured to electronically communicate with the electronic exchange platform 105. An electronic exchange platform 105 can include computer trading exchange 140 (e.g., a trading engine to match trades), a gateway system 130 (e.g., to communicate with clients), and an order book (e.g., to store data messages received from clients). The order book may be stored in or part of the computer trading exchange 140. Other components and/or systems, such as those shown in FIG. 2, may also be included in electronic exchange platform 105.t Client systems 110 can be associated with an individual and/or business entity (e.g., a retail broker or an individual trader) that is conducting electronic trading with the electronic exchange platform 105. The electronic exchange platform 105 communicates with the plurality of client systems 110, by using electronic data messages, to receive and match order messages including order instructions.

Client systems 100 include a central processing unit (CPU), a memory, and a data transmission device. The data transmission device can be, for example, a network interface device which connects the client system to the network. The connection can be wired, optical, or wireless and can connect over a Wi-Fi network, the Internet (120A), or a cellular data service, for example. In certain examples, client systems 110 may have a dedicated connection 120B to the electronic exchange platform 105 (e.g., to gateway 130 and/or computer trading exchange 140). The data transmission device can also be an input/output device that allows an example broker system to place the data on a computer-readable storage medium. The data transmission device is capable of sending and receiving data (e.g., a transceiver). Data may be received and/or transmitted by way of data packages—e.g., electronic data messages.

The client systems 110 are used for interacting with the electronic exchange platform 105. For example, the client system can be used for creating electronic data messages relating to the placement of orders for buying or selling securities and transmitting said electronic data messages to the electronic exchange platform 105. The client system can take an order from a user to buy or sell a certain number of shares for a particular stock and send the order the electronic exchange platform 105. The electronic exchange platform 105 can attempt to match, route (e.g., by using a routing strategy), or otherwise handle the received order.

Computer trading exchange 140, gateway system 130, and clearing house computer system 150 may include a CPU, memory, and a data transmission device. In example embodiments, these systems may include multiple processors and/or memories and may be designed for fail-safe redundancy. The data transmission device can be, for example, a network interface device that can connect the electronic exchange platform 105 to the network, and is capable of sending and receiving data (e.g., a transceiver). An order book exists in the memory of the exchange system (e.g., the trading exchange computer system 140 or another system).

It will be appreciated that computer trading exchange 140, gateway system 130, and/or clearing house computer system 150, may be comprised of one or more computing systems. In other words, these systems may be may physically separate computing systems or may be included in a single computer system.

As explained below, certain example may also include an order router. The order router may be implemented as part of computer trading exchange 140, and/or gateway 130. Alternatively, the order router may be implemented as a separate computing system (e.g., a separate computing node) within or outside of the electronic exchange platform 105.

The electronic exchange platform receives a data message order from a client system and attempts to match that order with a corresponding order in the order book. If the order is not successfully matched, the exchange can store the order in the order book. In certain example embodiments, the electronic exchange platform can partially match orders in the order book. In certain example embodiments, the electronic exchange platform (e.g., an order router) may route the received order to alternative trading destinations if the order is not matched.

Figure 2:
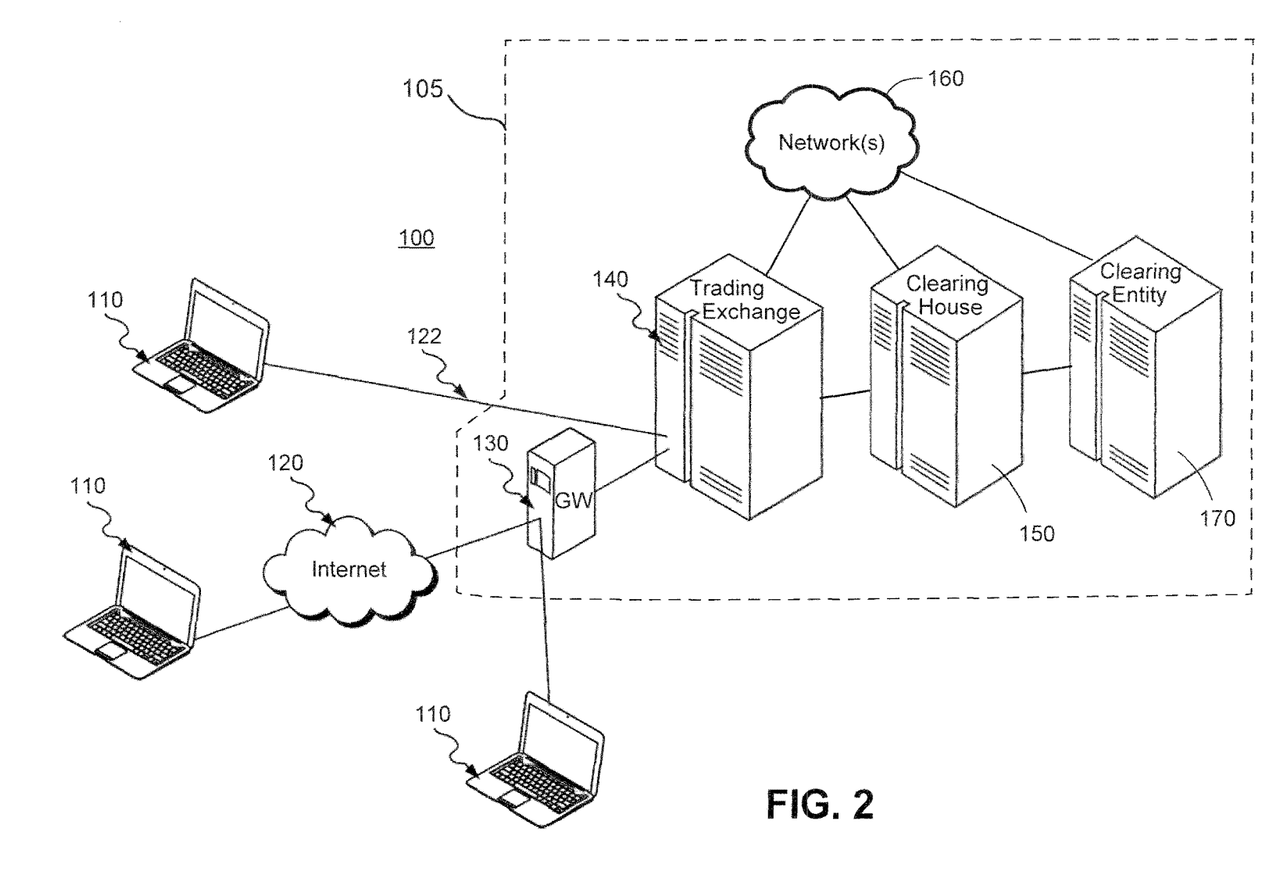
FIG. 2 illustrates a further expanded view of the block diagram of FIG. 1.

FIG. 2 is another block diagram of a non-limiting example automated, computer-implemented trading system of FIG. 1. Here, client systems (e.g., trader terminals) 110 are used for issuing electronic order data messages to electronic exchange platform 105. Electronic order data messages are received at gateway 130 and processed by computer trading exchange 140. Entry gateway 130 connects with the computer trading exchange 140 on a dedicated network and forwards received electronic order data messages to the computer-implemented trading exchange 140 and further usually broadcast updates back to the trader terminals 110. It should, however, be understood that information being communicated to and from the computer-implemented trading exchange 140 and the trader terminals 110 may be communicated via a single communication path.

While the trading terminals 110 are illustrated as trading terminals that traditionally are associated with manual input of market actions, the trading terminals 110 can also be implemented as algorithmic trading units, sometimes termed automatic order generators, having manual input for control of the algorithmic trading unit. The algorithmic trading unit is pre-programmed with instructions to automatically generate sell and buy orders and quotes (or changes/cancellations thereof) in response to input data (e.g., such as, for example, NASDAQ's TotalView market data feed) received from the computer-implemented exchange 140. The trading terminals 110 also represent market makers inputting quotes to the computer-implemented trading exchange 140. An exchange received order or quote (e.g., an electronic data message relating to the placement of an order) typically includes various attributes, such as an indication whether to buy/sell an instrument, a limit price/market price on the order, a quantity, and/or an indication of an account.

The computer-implemented trading exchange 140 includes or communicates with an associated computer-implemented clearing house 150 that includes one or more computers for maintaining account records, clearing executed trades, and reporting the same. The computer-implemented clearing house 150 also communicates with an associated computer-implemented clearing entity 170 including one or more computers. It will be appreciated that other arrangements of trading nodes (exchange 140, clearing house 150, etc) may be implemented when an electronic exchange platform 105 is implemented.

Order Router

Figure 3:
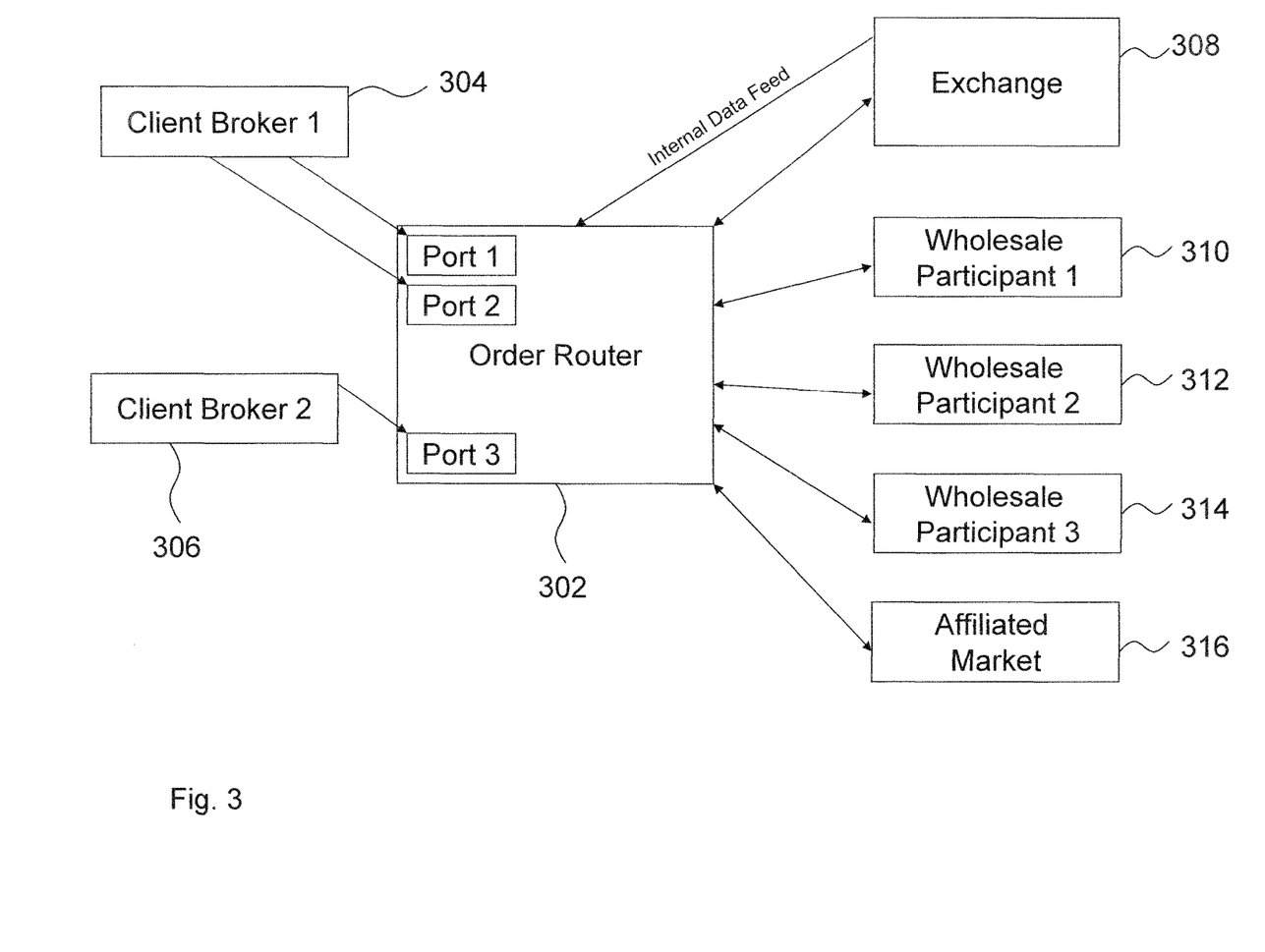
FIG. 3 illustrates a non-limiting example function block diagram of a computer-implemented order router that accepts and routes electronic orders.

FIG. 3 illustrates a non-limiting example function block diagram of a computer-implemented order router 302 that accepts and routes electronic orders from clients to trading destinations. Order router 302 may be part of an exchange system or separately provided (e.g., controlled by a different organization). The order router may be implemented on a computing system (e.g., a general purpose computer) by specifically programming the system in a certain way to implement functionality according to certain example embodiments.

Clients may include client brokers 304 and 306. Client brokers 304 and 306 are, for example, retail broker institutions that take orders from customers that are then relayed to order router 302 (e.g., for fulfillment of an order for a financial instrument). For example, a user of client broker 304 may have an account with that broker and place an order to buy 100 shares of Google. Based on the type of order, client broker 304 may determine how the 100 share order of Google is to be fulfilled (within certain regulatory requirements).

One factor that may determine which trading destination the order will be sent to may be whether the destination will "pay" (e.g., provide a rebate) for the order. In other words, client broker 304 may categorize orders that it receives from its users to help ensure that their order flow (the many different orders from clients of the broker) is sent to trading destinations offering superior economics. An example of this categorization is non-marketable orders vs. marketable orders. Because an exchange may provide a rebate for non-marketable orders (e.g., those that will add liquidity), client brokers may submit non-marketable order-flow to the exchange (and the associated order router). For example, for all the orders that a retail broker may receive (which are subsequently matched and executed), half may be non-marketable and half may be marketable. The half that is non-marketable may be sent to a typical exchange where it is intended to post on the exchange order book and thereby, possibly, generate a rebate (e.g., because liquidity was added) when the order is fulfilled. However, a certain percentage (e.g., 10%) of orders that are initially perceived to be non-marketable may change and become marketable by the time the orders are received at the exchange. This may result in the retail client being charged a fee by the exchange for "taking" from the order book and decreasing liquidity. Retail clients may wish to avoid such fees.

In certain example embodiments, clients submit orders to order router 302 through predefined electronic interfaces that specify how an order should be handled by the order router. In FIG. 3, port 1, port 2, and port 3 are maintained by order router 302 and respectively correspond to determined routing strategies (described later) employed by the order router 302.

Exchange 308 may also provide a continuous data feed (e.g., order book data from the exchange) to the order router 302. The data feed may include information that is not available to client brokers. Further, order router 302 may be positioned (both physically and logically) so that the latency between the order router 302 and the exchange 308 is less (e.g., more up-to-date) than the latency of financial information that is provided to client brokers 304 and 306 from the exchange 308.

As described in greater detail below, based on the provided internal data feed and a determined routing strategy, the order router 302 may route a received order to the exchange 308 or other trading destinations—e.g., wholesale participant 1 310, wholesale participant 2 312, wholesale participant 3 314, and/or affiliated market 316. Other trading destinations can include other "types" of markets with rebate structures different from those on the exchange 308. For example, a wholesale participant or affiliated market may include an exchange that implements a "taker-maker" rebate structure.

Trading destinations may include large banks, high frequency traders, other exchanges with possibly different rebate structures (e.g., taker-maker, the inverse of maker-taker structures, where removing liquidity generates a rebate and adding liquidity generates a fee), or other institutions that may wish to "internalize" their trades. These institutions may operate in this manner because interacting with an exchange may result in fees (e.g., for taking liquidity). Thus, trading destinations may be willing to pay for orders that are at or within the NBBO for a given financial instrument. Upon completion of trades in this manner (e.g., outside of an open exchange network), the trades may be reported to a trade reporting facility (or as otherwise required by certain regulatory bodies).

Figure 4:
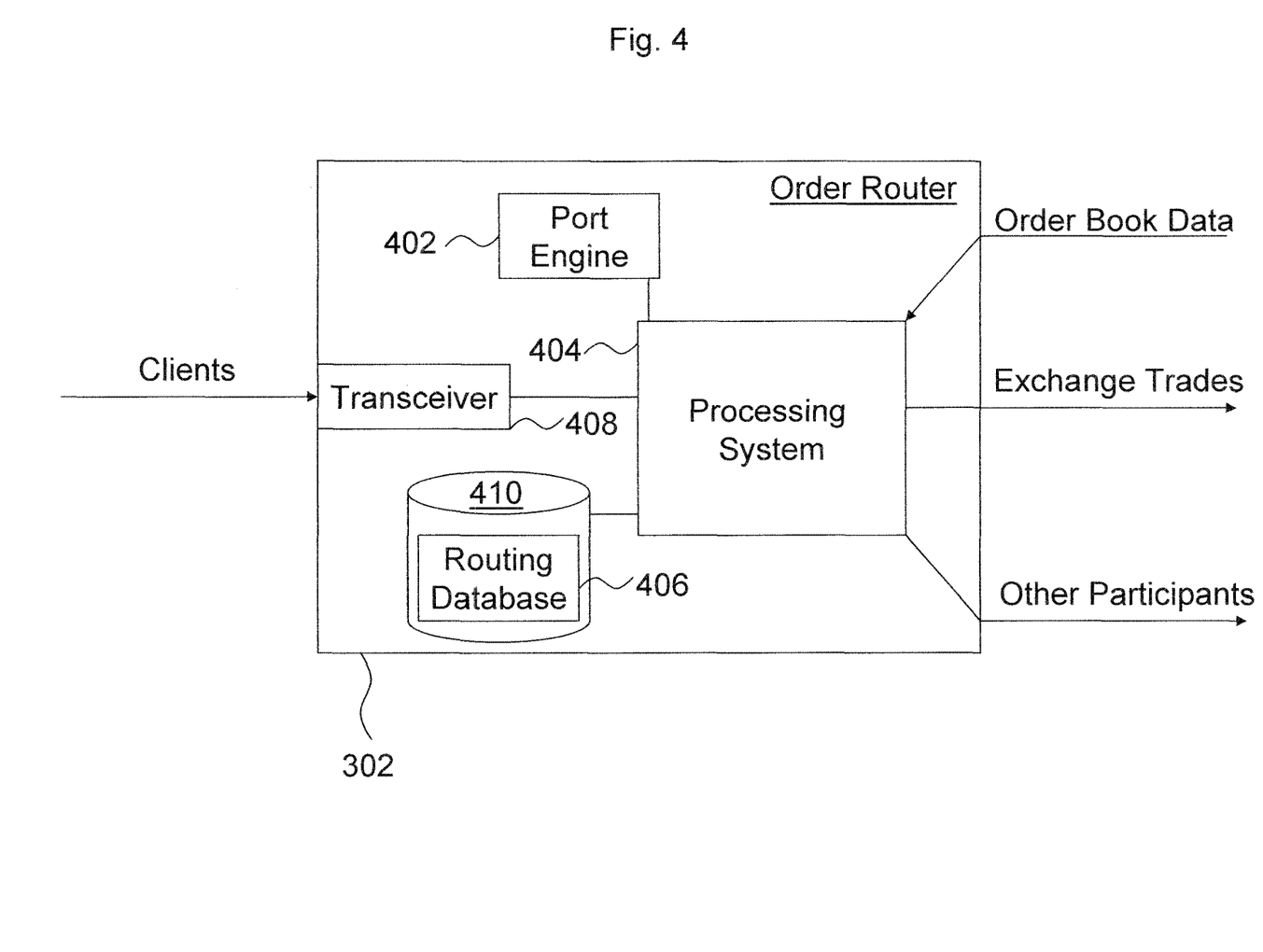
FIG. 4 illustrates another non-limiting example function block diagram of a computer-implemented order router.

FIG. 4 illustrates another non-limiting example function block diagram of the computer-implemented order router 302 of FIG. 3.

Here, the order router 302 includes a port engine 402 that is a service (e.g., a computer program) being executed by processing system 404 of order router 302. The port engine identifies or flags incoming electronic order data messages that are received (e.g., that the message will be subject to a particular routing strategy) by transceiver 408 from clients according the "port" at which the message is received. The identified port may be logical or physical in the order router (e.g., a logical port such as TCP or UDP port). A routing strategy is applied by the order router 302 from routing database 406 based on the port used by the received message. The routing database is stored in a storage medium 410 such as cache or RAM (e.g., volatile) or on, for example, a hard drive (e.g., non-volatile). The received order is routed based on the applied routing strategy (and possibly other information—e.g., received internal order book data).

Orders that are determined to be non-marketable may be sent to the exchange order book. In certain examples, this may include sending the order as a "post-only" order to the exchange. In contrast, orders that are determined to be marketable by the order router may be sent to other trading destinations and/or affiliated markets. Such orders may be successively sent to the other trading destinations according to a predetermined order. If the order is not completed (e.g., none of the other trading destinations will accept the order), then the order may be posted to the exchange order book as, for example, a limit order.

Accordingly, logic and functionality may be initiated on the port level of an exchange routing engine of an order router to receive and route marketable order flow to alternative trading destinations as opposed to directly onto the exchange order book.

Figure 5:
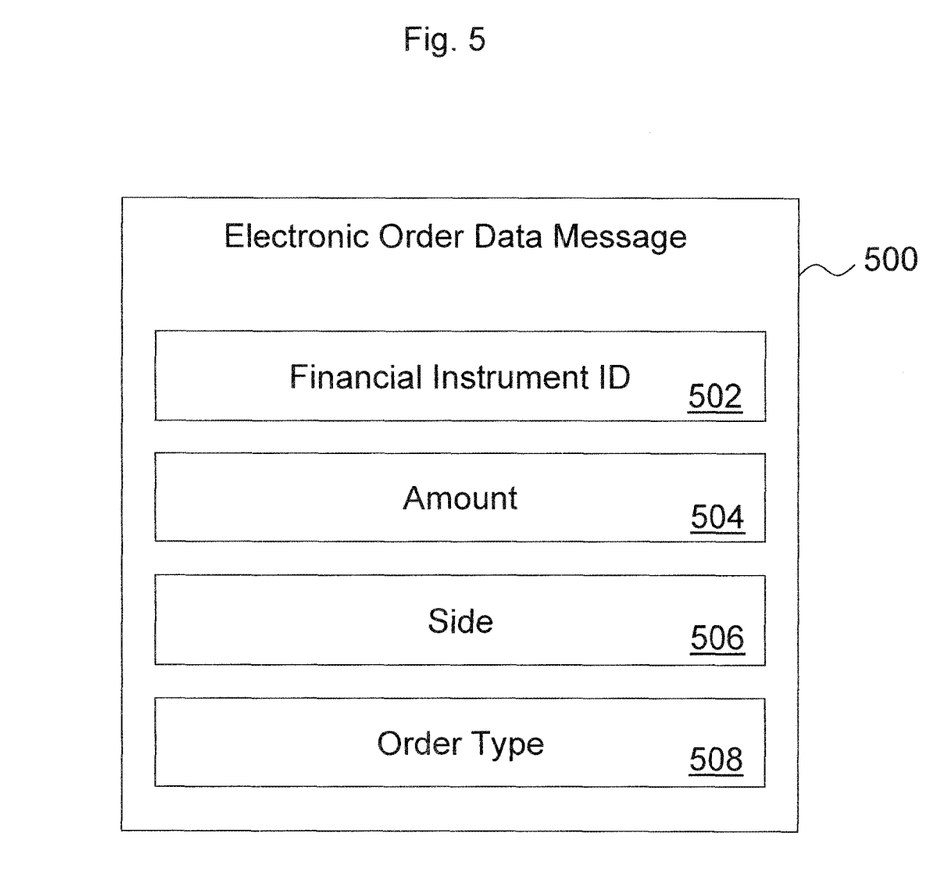
FIG. 5 illustrates a non-limiting example electronic order message that is received by an order router.

FIG. 5 illustrates a non-limiting example electronic order message that is received by an order router. Electronic order messages may include one or more data fields that are specified by order submitting clients that interact with an exchange, order router, or both. Electronic order message 500 includes a financial instrument ID field 502 that may include, for example, a ticker symbol for a stock. Amount 504 that specifies, for example, the number of shares of a given stock (or other financial instrument) that is the subject of the order. Side 506 can indicate that the order is a buy, sell, short sell, etc. Order type 508 includes, for example, market orders; limit orders, cross orders, etc. It will be appreciated that the four fields shown in FIG. 5 are given by way of example and that certain implementations may include more or fewer fields. For example, other fields may include: 1) A time to live field that indicates how long the order will be in force; 2) a client identifier to indicate the client that is submitting the order; 3) a routing strategy (e.g., to implement a specific routing strategy).

Certain techniques discussed herein may apply to limit orders. In other words, market orders are orders to buy at the NBBO price for that financial instrument. The techniques described herein may determine that a limit order (e.g., initially perceived to be non-marketable) will be marketable because the limit price on the order is at or within the NBBO on the exchange.

Figure 6:
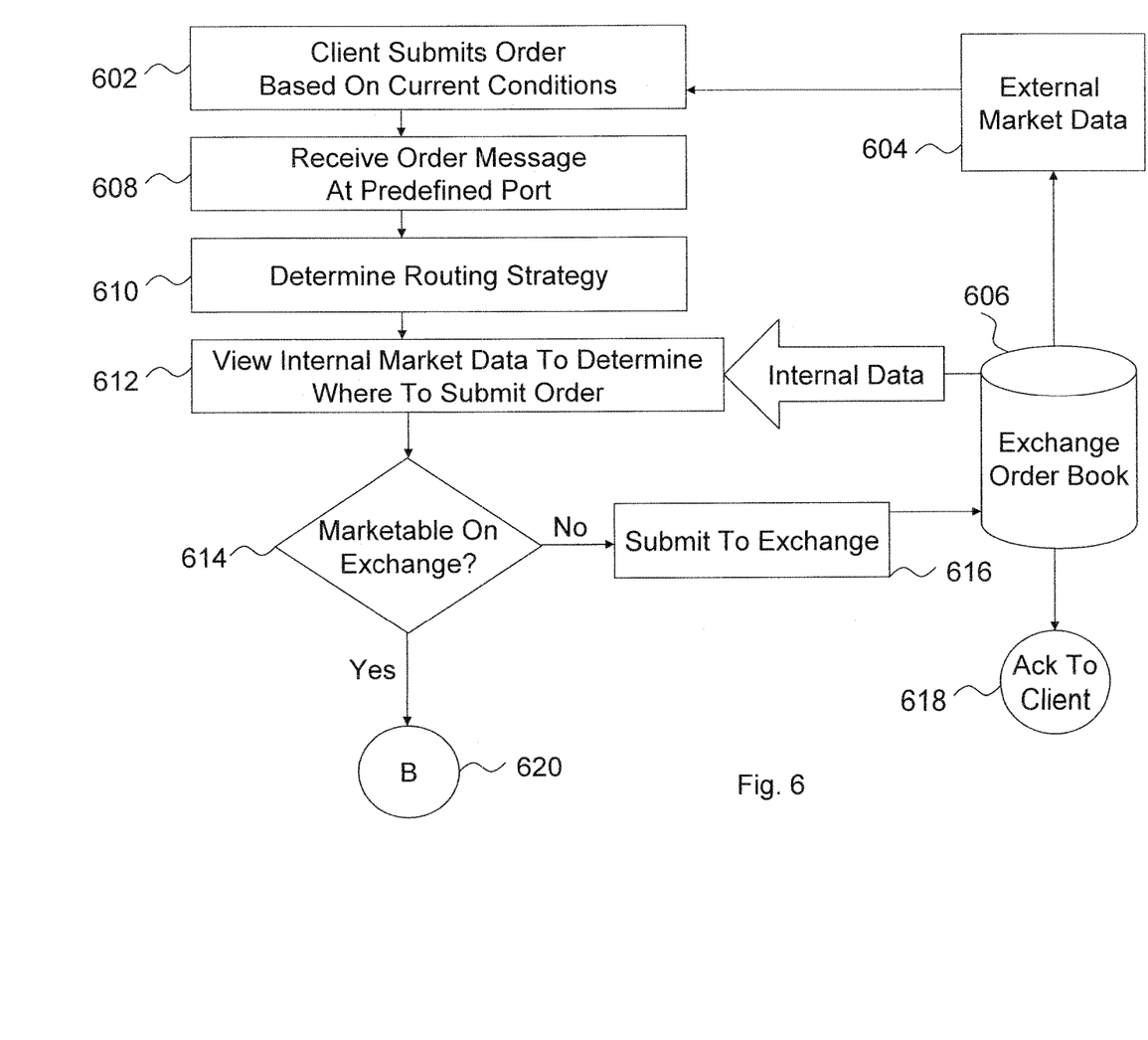
FIGS. 6 and 7 are flow charts showing an example process for routing orders according to certain example embodiments.
Figure 7:
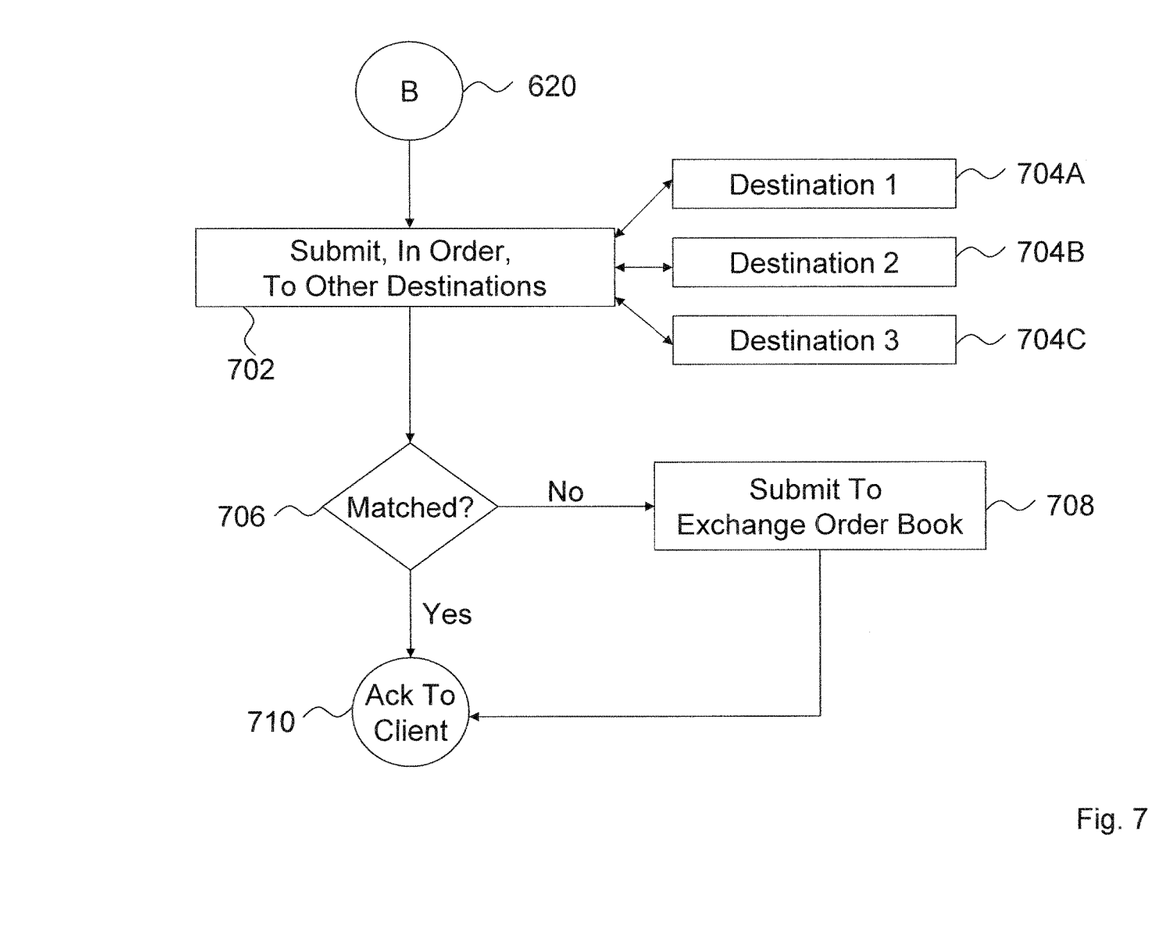

FIGS. 6 and 7 are flow charts showing an example process that are implemented according to certain example embodiments.

Clients (e.g., retail brokers) may subscribe or receive a data feed that includes external market data 604 from an exchange that is maintaining order book(s) 606. External market data 604 may include, for example, all displayed quotes and orders attributed to specific market participants, anonymous interests, the total size of all displayed quotes and orders, etc. Based on this and other information, a client may submit an electronic order message for a financial instrument in step 602 to an order router.

In step 608, the electronic order message is received at the order router at the port through which the client has connected to the order router. In step 610, a routing strategy is determined (e.g., from a routing database).

In certain example embodiments, the routing strategy is determined based on the port of the order router through which the newly received order has been received. In certain example embodiments, clients may have one or more connections established to fixed ports of an order router. Certain ports of the order router may be tied to particular clients (e.g., large clients that submit many orders) or certain order types. Thus, for example, if an order is submitted to port XYZ on the order router, the order router may automatically select routing strategy X for the submitted order from among the multiple stored possible routing strategies.

In any event, in step 612, internal market data is received from a corresponding exchange (e.g., a "core" exchange system that maintains an order book) which is analyzed to determine how the submitted order should be routed. The internal data provided to the order router from the exchange may provide increased (e.g., over the provided external data) visibility into displayed and hidden liquidity on the order book for a given financial instrument. Furthermore, the proximity of the order router to the exchange order book may give the order router an increased ability to distinguish between marketable and non-marketable states of the financial instrument. Thus, the order router's ability to distinguish between marketable and non-marketable states may be better than the client who originally submitted the order.

In step 614, based on analysis of the internal market data, the order router determines if an order included in the electronic order message is marketable (e.g., if it were to be submitted to the exchange order book 606). In other words, is the order for the financial instrument outside of the National Best Bid and Offer (NBBO) in the exchange order book (non-marketable) or is it at or within the NBBO (marketable)? Based on this determination, the order router then submit orders that are non-marketable to the exchange in step 616 (e.g., as originally intended by the client), while orders that marketable proceed to step 620 and FIG. 7.

Non-marketable orders submitted to the exchange will add liquidity to the exchange order book and can result in a rebate for the client who submitted the order when the order is taken off (e.g., matched with a corresponding order) the order book. These orders may be submitted as a certain order type to the exchange. For example, the order may be submitted as a true post only order such that if an order does not post, it will be sent back to the order router and added to the inventory of marketable order flow (e.g., as shown in FIG. 7).

If the order router determines that an order (e.g., a trade request) for the financial instrument indicated in the electronic order message is marketable, then the electronic order message is routed to other trading destinations in step 702. In step 702, the order router successively routes (e.g., by blind pining) the order to trading destinations 1, 2, and 3 (704A, 704B, 704C). Trading destinations may include wholesale destinations (e.g., destinations that offer a superior economic rebate structure and/or execution quality) and/or affiliated markets (e.g., those that offer rebates for order flow). During this process the order router will accept trade confirmations from the alternative destinations as well as indications that the order was un-matched.

In step 706, if the order in the electronic order message is matched (e.g., a trade is created) a confirmation or acknowledgement is sent to the submitting client in step 710. If the order is not matched, the order included in the electronic order message will continue to be sent to other destinations until it is matched.

In certain example embodiments, the order router maintains an ordered list (e.g., a table of trading destinations). If the trading destinations are exhausted (e.g., the trade is not matched after pining each of the trading destinations), then the order is routed to an affiliated market (e.g., one that may offer a rebate). If the order is still not executed after submission to the affiliated market, then in step 708 the order is submitted to the exchange order book 606. In certain example embodiments, the order may be submitted as a "post-only" order (e.g., the order will not will not take from the order book unless the fee for taking liquidity associated with the order is less than the price difference of executing the order at the current BBO price on the order book). In certain examples, the order may be submitted as a regular market order that will take from the order book. In certain examples, the market for the financial instrument may have moved from when the order book was first checked and thus the order may now be non-marketable again). In any event, after posting or taking from the exchange order book, an acknowledgement is then sent to the client in step 710.

In certain example embodiments, the exchange and/or the order router may maintain a database that tracks rebates and changes for an order submitting client. For example, an order submitting client that submits an order to the order router that it perceives to be non-marketable, but turns out to be marketable will receive a portion, all, or none of the rebate provided by the trading destination that accepted the marketable order. In other words, trading destinations may pay an exchange to receive marketable order flow and the exchange may pass on the "rebate" to the order submitting client (or a portion thereof). This type of rebate structure may incentivize clients to submit an increasing amount of orders through organizations that maintain an order router (and a corresponding exchange).

In certain example embodiments, an existing order router may be updated with a new or changed routing strategy as described herein. In other words, an existing order router may be modified or programmed to provide new functionality for the order router—thus creating a new machine.

In certain example embodiments, an order router system is provided to detect or recognize when volatility movement in a financial instrument result in "in-flight" orders changing from non-marketable to marketable. In certain examples, order messages that are received from order submitting clients may be perceived to be non-marketable based on the "port" of the order routing system through which the order message is received. The order router may then determine that the order message is now marketable and route the order message based on this determination.

Figure 8:
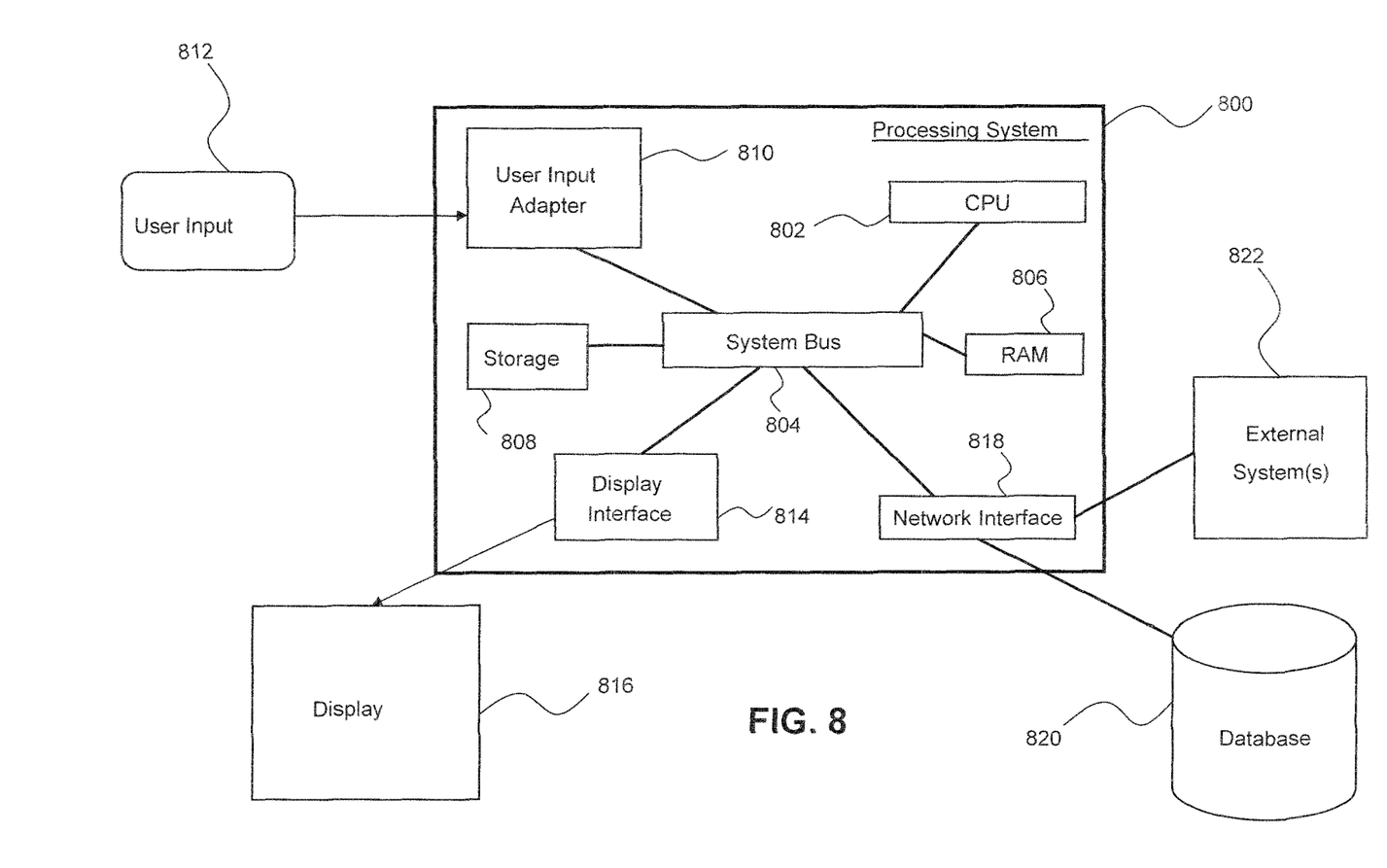
FIG. 8 illustrates a non-limiting example function block diagram of a computing system according to certain example embodiments.

FIG. 8 is a block diagram of an exemplary computing system according to certain example embodiments (e.g., one that is used when implementing an order router). A processing system 800 includes a central processing unit or CPU 802, a system bus 804 that communicates with RAM 806, and storage 808. The storage 808 can be magnetic, flash based (e.g., for a mobile client device), solid state, or other storage technology. The system bus 804 communicates with user input adapter 810 (e.g., PS/2, USB interface, or the like) that allows users in input commands to processing system 800 via a user input device 812 (e.g., a keyboard, mouse, touch panel, or the like). The results of the processing may be displayed to a user on a display 816 (e.g., an LCD) via display interface 814 (e.g., a video card or the like).

The processing system 800 may also include a network interface 1018 (e.g., a transceiver) to facilitate wired (e.g., Ethernet—802.3x) and/or wireless communication (WiFi/802.11x protocols, cellular technology, and the like) with external systems 822 and/or databases 820. External systems 822 may include other processing systems, systems that provide third party services, etc. Here, external systems 822 may be client devices or server systems. For example, an example server system may include an computer system that hosts an electronic exchange and/or order router that communicates with clients over the Internet via a web browser or other thin (or thick) client system.

External systems 822 may also include network attached storage (NAS) to hold large amounts of data. External systems, along with the internal storage and memory, may form a storage system for storing and maintaining information (e.g., order book information, routing strategies, etc). Such a system may communicate with users and/or other computing systems that processor electronic order data messages. The database 820 may include relational, object orientated, or other types of databases for storing information (e.g., order book information for a financial instrument).

In other words, the processes, techniques, and the like, described herein (for client devices, server, and/or controller systems) may be implemented on a computing system. Such implementations may then configure or program the processing system to carry out aspects according to certain example embodiments. It will be appreciated that other architecture types may be used. For example, a CPU may include multiple CPU "cores." Further, the various elements shown in connection with FIG. 8 may be included into one cohesive physical structure (e.g., such as a tablet device).

Although various embodiments have been shown and described in detail, the claims are not limited to any particular embodiment or example. None of the above description should be read as implying that any particular element, step, range, or function is essential. All structural and functional equivalents to the elements of the above-de-

The invention claimed is:

1. A routing device for routing an electronic order data message comprising:
   a storage medium configured to store a routing table;
   a transceiver configured to communicate with a first set of computing nodes, a first electronic trading platform, and a second set of electronic trading platforms; and
   a processing system that includes at least one processor, the processing system configured to:
      accept, using the transceiver, the electronic order data message from at least one of the first set of computing nodes;
      accept, using the transceiver, a financial data message feed from the first electronic trading platform, where the financial data message feed includes copies of different types of data messages kept in an order memory of the first electronic trading platform;
      determine whether the accepted electronic order data message is in a marketable or non-marketable operation state with the first electronic trading platform by comparing data from a predefined data field of the accepted electronic order data message to the accepted financial data message feed from the first electronic trading platform;
      select a routing strategy from the stored routing table;
      determine at least one routing destination from at least one of the second set of electronic trading platforms based on (1) the selected routing strategy and (2) the determination that the accepted electronic order data message is in a marketable operation state with the first electronic trading platform; and
      in accordance with the determined at least one routing destination, route, by transmitting using the transceiver, the electronic order data message to the determined routing destination of the at least one second set of electronic trading platforms.

2. The routing device of claim 1, wherein the processing system is further configured to maintain a plurality of ports through which electronic order data messages may be accepted from the first set of computing nodes, wherein the accepted electronic order data message is accepted in correspondence with a first port out of the plurality of ports,
   wherein the selecting routing strategy is further based on an identification that the accepted electronic order data message was accepted in correspondence with the first port out of the plurality of ports.

3. The routing device of claim 1, wherein the financial data message feed includes hidden and visible copies of data messages kept in the order memory of the first electronic trading platform, where the hidden data messages includes information on an order book that is not available to external customers of the first electronic trading platform.

4. The routing device of claim 1, wherein the accepted electronic order data message is determined to be in the marketable or non-marketable operation state without first routing the accepted electronic order data message to the first electronic trading platform.

5. The routing device of claim 1, wherein the electronic order data message includes an identifier for a financial instrument and an indicated price for which the order is to be matched.

6. The routing device of claim 1, wherein the processing system is further configured to:
   in response to determining that another accepted electronic order data message is in a non-marketable operation state, route the another electronic order data message to the first electronic trading platform for execution.

7. The routing device of claim 6, wherein the storage medium is further configured to store an ordered list of the second set of electronic trading platforms,
   wherein the processing system is configured to successively send the electronic order data message to the second set of electronic trading platforms according to the ordered list.

8. The routing device of claim 7, wherein the processing system is further configured to:
   if the electronic order data message does not result in a matching of the order by one or more of the second set of electronic trading platforms, send an electronic trading request based on the electronic order data message to the first electronic trading platform for execution.

9. A computerized trading exchange system comprising:
   a routing device for routing an electronic order data message comprising:
      a storage medium configured to store a routing table;
      a transceiver configured to communicate with a first set of computing nodes, a first electronic trading platform, and a second set of electronic trading platforms;
      a processing system that includes at least one processor, the processing system configured to:
         accept, using the transceiver, the electronic order data message from at least one of the first set of computing nodes;
         accept, using the transceiver, a financial data message feed from the first electronic trading platform, where the financial data message feed includes copies of different types of data messages kept in an order memory of the first electronic trading platform;
         determine whether the accepted electronic order data message is in a marketable or non-marketable operation state with the first electronic trading platform by comparing data from a predefined data field of the accepted electronic order data message to the accepted financial data message feed from the first electronic trading platform;
         select a routing strategy from the stored routing table;
         determine at least one routing destination from at least one of the second set of electronic trading platforms based on (1) the selected routing strategy and (2) the determination that the accepted electronic order data message is in a marketable operation state with the first electronic trading platform; and
         in accordance with the determined at least one routing destination, route, by transmitting using the transceiver, the electronic order data message to the determined routing destination of the at least one second set of electronic trading platforms, wherein the first electronic trading platform comprises:
a second storage medium configured to store an electronic order book that includes bids and offers for at least a first security; and
a second transceiver configured to communicate the financial data message feed to the routing device, the financial data message feed including bid and offer information from the electronic order book listing for the first security,
wherein the electronic order data message includes an order for the first security,
wherein when the electronic order data message is determined to be in a marketable operation state, the processing system is further configured to route the electronic order data message to one or more of the second set of electronic trading platforms for matching of the order before being routed to the first electronic trading platform for execution of the order.

10. A method of routing an electronic order data message on a routing node that is configured to communicate, using a transceiver, with a first set of computing nodes, a first electronic trading platform, and a second set of electronic trading platforms, the method comprising:
receiving, using the transceiver, the electronic order data message from at least one of the first set of computing nodes;
accepting, using the transceiver, an updated financial data message feed from the first electronic trading platform, where the financial data message feed includes copies of different data messages kept in an order memory of the first electronic trading platform;
determining whether the accepted electronic order data message is in a marketable or non-marketable operation state with the first electronic trading platform by comparing data from a data field of the accepted electronic order data message to the updated financial data message feed from the first electronic trading platform;
selecting a routing strategy for the electronic order data message from a stored routing table;
determining at least one routing destination based on the selected routing strategy and the determination of whether the accepted electronic order data message is in a marketable or non-marketable operation state, wherein the at least one routing destination is associated with the second set of electronic trading platforms and is determined as a result of determining the accepted electronic order data message is in a marketable operation state with the first electronic trading platform; and
routing, by transmitting using the transceiver, the electronic order data message to the determined least one routing destination.

11. The method of claim 10, further comprising:
maintaining a plurality of ports through which electronic order data messages may be accepted from the first set of computing nodes, wherein the accepted electronic order data message is accepted in correspondence with a first port out of the plurality of ports,
wherein selecting the routing strategy is further based on an identification that the accepted electronic order data message was accepted in correspondence with the first port out of the plurality of ports.

12. The method of claim 10, further comprising
transmitting, using the transceiver, a confirmation message to at least one of the first set of computing nodes upon matching of an order associated with the accepted electronic order data message.

13. The method of claim 10, wherein:
in response to determining that another accepted electronic order data message is in a non-marketable operation state, routing the another accepted electronic order data message to the first electronic trading platform for execution.

14. The method of claim 10, wherein the determining that the accepted electronic order data message is in the marketable or non-marketable operation state is accomplished without routing the accepted electronic order data message to the first electronic trading platform.

15. The method of claim 10, further comprising:
storing an ordered list associated with the second set of electronic trading platforms,
wherein routing the electronic order data message to the determined least one routing destination includes successively sending orders to the second set of electronic trading platforms according to the ordered list.

16. The method of claim 15, further comprising:
if the electronic order data message does not result in a matching of the order by one or more of the second set of electronic trading platforms, sending an electronic trading request based on the electronic order data message to the first electronic trading platform to post on the order book or execute.

17. A non-transitory computer readable storage medium storing instructions for use with a routing device that communicates, by using a transceiver, with a first set of computing nodes, a first electronic trading platform, and a second set of electronic trading platforms, the stored instructions comprising instructions that are configured to cause at least one processor of the routing device to:
accept, using the transceiver, the electronic order data message from at least one of the first set of computing nodes;
accept, using the transceiver, an updated financial data message feed from the first electronic trading platform, where the financial data message feed includes copies of different data messages kept in an order memory of the first electronic trading platform;
determine whether the accepted electronic order data message is in a marketable or non-marketable operation state by comparing data from a predefined data field of the accepted electronic order data message to the updated financial data message feed;
select a routing strategy for the accepted electronic order data message from a stored routing table;
select at least one routing destination based on the selected routing strategy and determination of whether the accepted electronic order data message is in a marketable or non-marketable operation state, wherein the at least one routing destination is associated with the second set of electronic trading platforms and is selected as a result of determining that the accepted electronic order data message is in a marketable operation state with the first electronic trading platform; and
route, by transmitting using the transceiver, the electronic order data message to the selected least one routing destination.

18. The non-transitory computer readable storage medium of claim 17, wherein the instructions are configured to cause at least one processor of the routing device to:
route another electronic order data message to the first electronic trading platform for execution based on determination that the accepted another electronic order data message is in the non-marketable operation state.

19. The non-transitory computer readable storage medium of claim 18, wherein the instructions are configured to cause at least one processor of the routing device to:
- retrieve an ordered list of the second set of electronic trading platforms from a storage medium of the routing device;
- successively send the electronic order data message to the second set of electronic trading platforms according to the ordered list.

20. The non-transitory computer readable storage medium of claim 19, wherein the instructions are configured to cause at least one processor of the routing device to:
- if the electronic order data message does not result in execution of the electronic order data message with one or more of the second set of electronic trading platforms, send an electronic trading request based on the electronic order data message to the first electronic trading platform for execution against an order book therein or placement in the order book.

* * * * *